(12) United States Patent
Bortone

(10) Patent No.: US 6,783,787 B2
(45) Date of Patent: Aug. 31, 2004

(54) APPARATUS AND METHOD FOR IMPROVING THE DIMENSIONAL QUALITY OF DIRECT-EXPANDED FOOD PRODUCTS HAVING COMPLEX SHAPES

(75) Inventor: Eugenio Bortone, Frisco, TX (US)

(73) Assignee: Frito-Lay North America, Inc., Plano, TX (US)

( * ) Notice: Subject to any disclaimer, the term of this patent is extended or adjusted under 35 U.S.C. 154(b) by 317 days.

(21) Appl. No.: 10/109,398

(22) Filed: Mar. 28, 2002

(65) Prior Publication Data

US 2003/0185953 A1 Oct. 2, 2003

(51) Int. Cl.[7] .............................. A23P 1/12; B29C 47/00
(52) U.S. Cl. ................. 426/516; 425/131.1; 425/133.1; 425/382.4; 425/467; 426/449
(58) Field of Search ................................. 426/516, 448, 426/449; 425/131.1, 133.1, 382.4, 467, 573

(56) References Cited

U.S. PATENT DOCUMENTS 4,786,243 A * 11/1988 Kehoe ..................... 425/131.1
6,258,396 B1 * 7/2001 Deutsch et al. ............. 426/516

* cited by examiner

*Primary Examiner*—George C. Yeung
(74) *Attorney, Agent, or Firm*—Jeffrey G. Degenfelder; Carstens, Yee & Cahoon, L.L.P.

(57) ABSTRACT

The present invention comprises an improved extruder die assembly and method for using same to improve the quality of dimensional design aspects of extruded, complexly shaped, direct expanded food products. The improved system includes an improved extruder die assembly comprising an imprinting insert element having a first aperture defined therethrough and at least one prong extending into the first aperture, and a forming insert element having a second aperture defined therethrough and positioned downstream from the imprinting insert element, wherein the shape of the second aperture is defined by at least one projection extending into the second aperture, and wherein each of the at least one projection aligns with a prong when the first and second apertures are coaxially aligned. The improved extruder die assembly of the present invention is designed for adaptation to a wide variety of commercial-grade extrusion devices common in the food industry.

25 Claims, 5 Drawing Sheets

CFLAY.00076

CFLAY.00076

CFLAY.00076

CFLAY.00076

US 6,783,787 B2

APPARATUS AND METHOD FOR IMPROVING THE DIMENSIONAL QUALITY OF DIRECT-EXPANDED FOOD PRODUCTS HAVING COMPLEX SHAPES

BACKGROUND OF THE INVENTION

1. Technical Field

The present invention relates to an apparatus and method for improving the dimensional quality of direct expanded food products. More specifically, the present invention relates to an apparatus and method for improving the dimensional quality of direct expanded food products having complex shapes.

2. Description of the Related Art

The use of extrusion devices in the preparation of direct expanded food products is long practiced. Utilized to produce a variety of products such as ready-to-eat (R-T-E) cereals, snack foods and confections, extrusion remains prominent among food processes because of its versatility and efficiency.

Food processes utilizing extrusion devices typically include an edible substance such as dough which is introduced into a device and conveyed via a screw pump to an inlet where the substance is forced through an extruder die assembly. The extruder die assembly may perform a variety of functions: it may form or shape the extrudate; it may divide the extrudate into a multiple extrudates; it may inject an additive substance into the extrudate; and it may compress and reduce the cross-sectional area of the extrudate. Upon exiting the extruder die assembly, the extruded mass is directly expanded (e.g., via flash puffing) and typically cut into individual pieces using a reciprocating blade mechanism. The resulting individual pieces typically have a uniform, puffed shape with a cross-sectional shape generally corresponding to the outline of the forming die's exit port. While the characteristics of the resulting individual pieces are satisfactory for simple geometric shapes (e.g., spheres, ovoids, and crescents), the design details of more complex shapes tend to be obscured or eliminated.

For example, FIG. 1a shows the exit face 12 of a forming die 10 used in prior art extruder die assembly. Included within the periphery of the exit face 102 is a complexly shaped exit port 14. The outline 16 of exit port 14 is designed to resemble a hand with four distinct appendages or fingers. When the forming die 10 is utilized in conjunction with a conventional direct expanded food process, the resulting product is a uniformly puffed food piece 18 as shown in FIG. 1b. While the shape of the outline 16 of exit port 14 is somewhat discernable in food piece 18, the design details of the four distinct appendages is generally diminished and obscured. The individual dimensional aspects of the four distinct appendages are simply absorbed by the dimensional aspects of the palm area of the outline 16 of exit port 14.

A need, therefore, exists for an improved apparatus and method for enhancing the quality of dimensional design aspects of extruded, complexly shaped, direct expanded food products.

SUMMARY OF THE INVENTION

The present invention overcomes many of the shortcomings inherent in prior art apparatus and methods addressing extruder die assemblies. The present invention comprises an improved extruder die assembly and method for using same to improve the quality of dimensional design aspects of extruded, complexly shaped, direct expanded food products.

The improved system includes an improved extruder die assembly comprising a transition insert section, a plurality of spacer insert elements, an imprinting insert element, and a forming insert element, all of which are coaxially aligned and interlocking. The improved extruder die assembly of the present invention is designed for adaptation to a wide variety of commercial-grade extrusion devices common in the food industry. The imprinting insert element includes at least one prong which, when properly configured, is aligned with a corresponding projection in the forming insert element, and momentarily disrupts the axial flow of an extrudate altering its velocity profile. By disrupting the axial flow the extrudate in close proximity to the projections in the forming insert element prior to its extrusion, the dimensional quality of the resulting direct expanded food piece is greatly improved.

The axial distance between the one or more prongs and its corresponding projection may be adjusted as necessary using spacer insert elements to optimize the dimensional qualities of the resulting food piece depending upon the particular flow characteristics of each extrudate.

BRIEF DESCRIPTION OF THE DRAWINGS

A more complete understanding of the method and apparatus of the present invention may be had by reference to the following detailed description when taken in conjunction with the accompanying drawings, wherein.

Figure 1A:
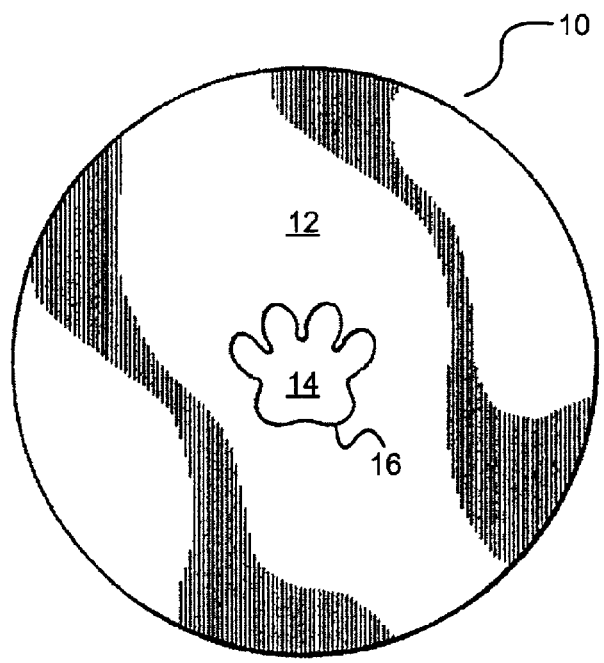
FIG. 1a is an exit face view of a forming die used in prior art extruder die assembly.
Figure 1B:
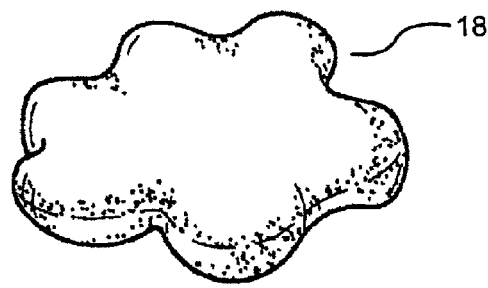
FIG. 1b depicts the resulting direct expanded food piece formed by utilizing the forming die shown in FIG. 1a in a conventional direct expanded food process.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

DETAILED DESCRIPTION OF THE INVENTION

Figure 2A:
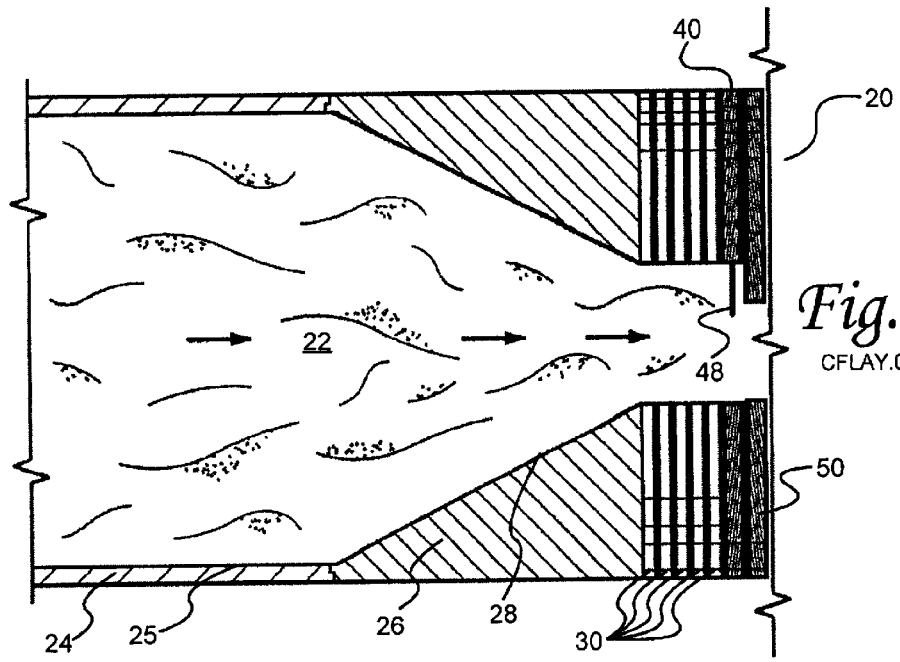
FIG. 2a is cross-sectional view of an embodiment of the extruder die assembly of the present invention.

Referring now to FIG. 2a, a cross-sectional view of an embodiment of the extruder die assembly 20 of the present invention is shown. As shown in the embodiment in FIG. 2a, the improved extruder die assembly 20 may include a transition insert section 26, a plurality of spacer insert elements 30, an imprinting insert element 40, and a forming insert element 50, all of which are coaxially aligned and interlocking.

The extruder die assembly 20 of the present invention is designed for adaptation to a wide variety of commercial-grade extrusion devices common in the food industry. While the embodiment illustrated is shown as being generally cylindrical in shape, the exterior housing of the extruder die assembly 20 may be of any shape necessary for adaptation to commercial-grade extrusion devices common in the food industry. The extruder die assembly 20 is inserted into the appropriate compartment within an extrusion device (not shown) and connected to a coaxially aligned supply conduit 24 having a passageway 25 whereby an extrudate 22 (e.g., a paste or a cereal dough) is directed through the assembly 20. Upon exiting the improved extruder die assembly 20, the extrudate 22 is thereupon directly expanded and cut into individual pieces in the conventional manner.

The transition insert section 26 attaches to the supply conduit 24 and directs the flow of extrudate 22 through passageway 28 to a passageway defined by apertures in each of the spacer insert elements 30. The cross sectional area of the passageway 28 defined through the transition insert section 26 may be reduced as necessary to smoothly transition the flow of extrudate 22 from the passageway 24 of supply conduit 24 to the passageway defined by apertures in each of the plurality of spacer insert elements 30. Of course, the transition insert section 26 may be dispensed with entirely if the supply conduit 24 may be attached directly to the plurality of spacer insert elements 30.

Figure 3:
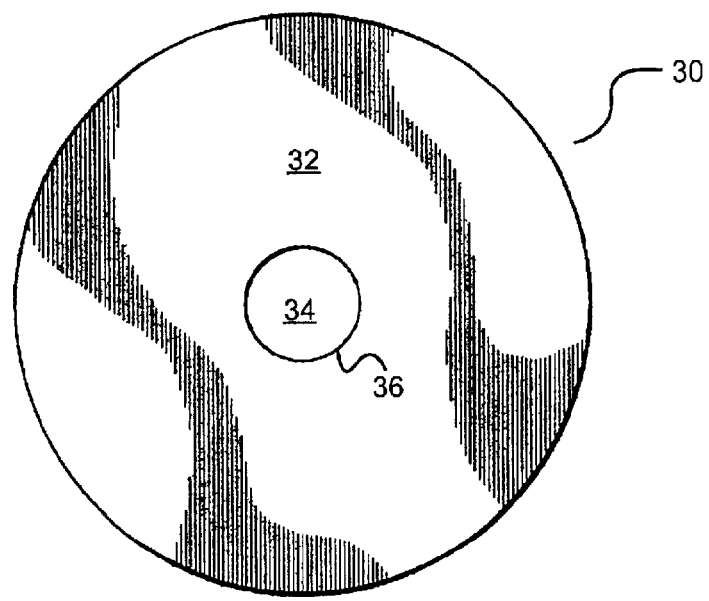
FIG. 3 is an exit face view of a spacer insert element used in an embodiment of the extruder die assembly of the present invention.

As illustrated in FIG. 3, each of the plurality of spacer insert elements 30 includes a matching aperture 34 defined therethough having a circumference 36, such that when coaxially aligned, the plurality of spacer insert elements 30 define a passageway through which the extrudate 22 may flow.

Figure 4:
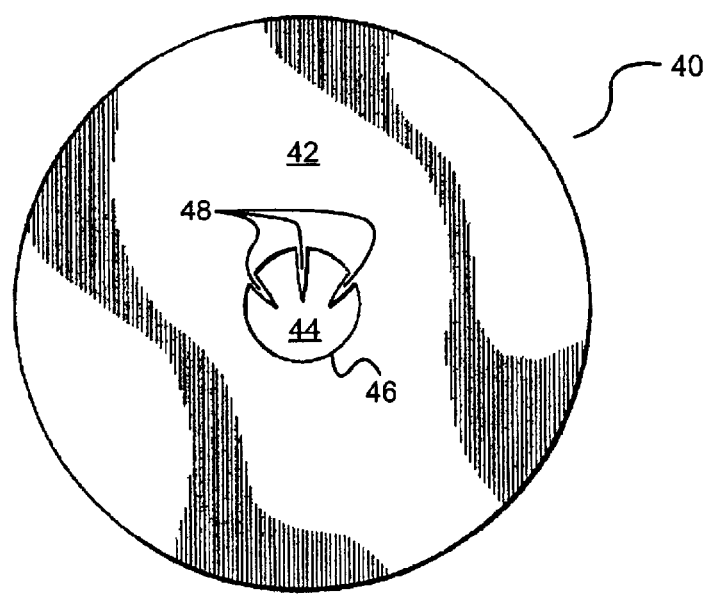
FIG. 4 is an exit face view of the imprinting insert element used in an embodiment of the extruder die assembly of the present invention.

Referring now to FIG. 4, an embodiment of the imprinting insert element 40 is illustrated. The imprinting insert element 40 includes an aperture 44 defined therethough having a circumference 46 which generally corresponds to the circumference 36 of the aperture 34 defined in the spacer insert elements 30, with the exception that the aperture 44 of imprinting insert element 40 includes one or more prongs 48 projecting into the aperture 44.

Figure 5:
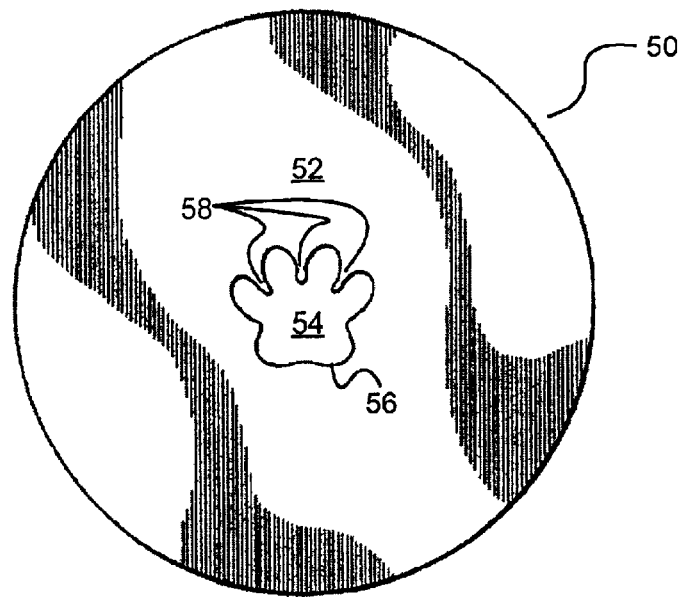
FIG. 5 is an exit face view of the forming insert element used in an embodiment of the extruder die assembly of the present invention.

FIG. 5 shows an embodiment of a forming insert element 50 used in the present invention. The forming insert element 50 includes an aperture 54 defined therethough having a complexly shaped circumference 56. The complex shape of circumference 56 is defined by one or more projections 58 which extend into the center of aperture 54.

Figure 2B:
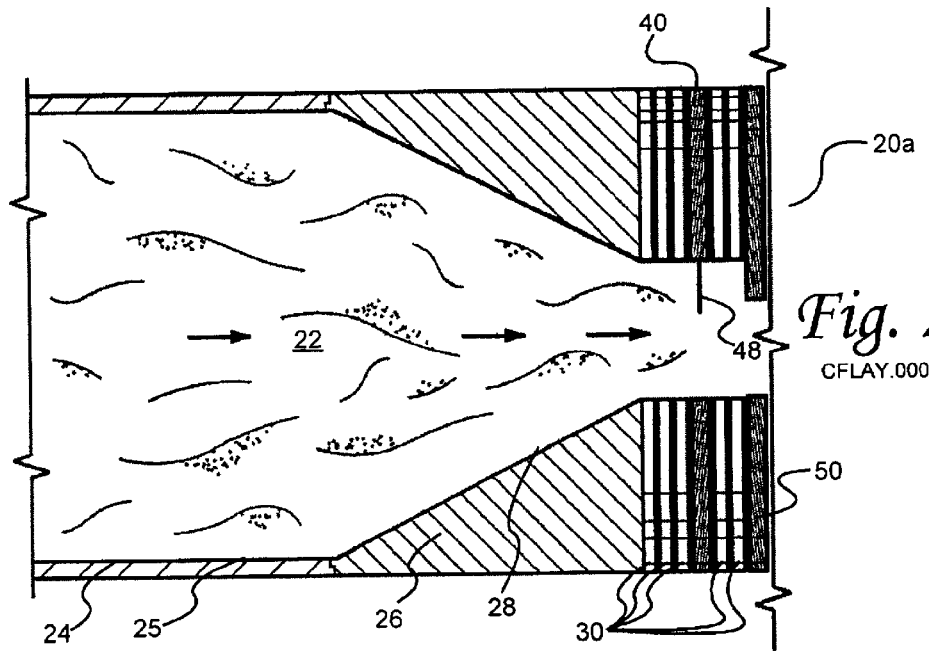
FIG. 2b is cross-sectional view of an alternate arrangement of an embodiment of the extruder die assembly of the present invention.
Figure 6:
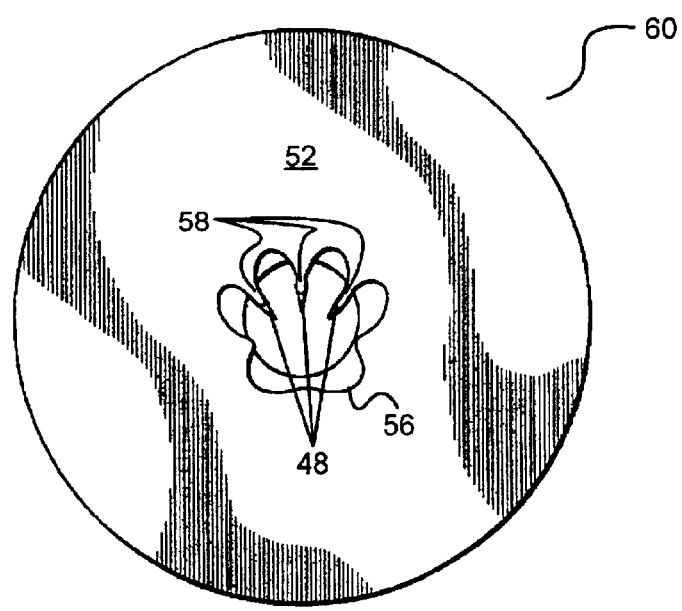
FIG. 6 is an exit face view of an embodiment of the extruder die assembly of the present invention.
Figure 7:
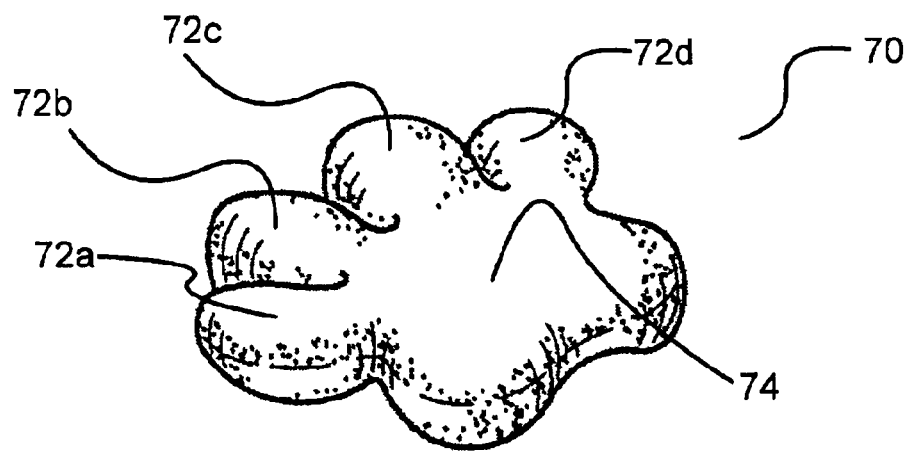
FIG. 7 depicts the resulting direct expanded food piece formed by utilizing an embodiment of the extruder die assembly of the present invention.

As shown in the exit face view of an embodiment of the extruder die assembly of the present invention illustrated in FIG. 6, when the improved extruder die assembly 20 of the present invention illustrated in FIGS. 2a and 2b is properly assembled and configured, each of the projections 58 of the forming insert element 50 is aligned with a prong 48 of the imprinting insert element 40. The prongs 48 momentarily disrupt the axial flow of the extrudate 22 altering its velocity profile prior to its extrusion through the aperture 54 of the forming insert element 50. By disrupting the axial flow of the extrudate 22 in the vicinity of the projections 58 in the forming insert element 50 prior to its extrusion, the dimensional quality of the resulting direct expanded food piece is greatly improved. As shown in FIG. 7, the resulting food piece 70 exhibits an improved three-dimensional quality such that each of the appendages 72a–d is more clearly defined and The axial distance between the one or more projections 58 and its corresponding prongs 48 may be adjusted as necessary to optimize the dimensional qualities of the resulting food piece depending upon the particular flow characteristics (e.g., flow velocity, viscosity, and texture) of each extrudate 22. For example, as shown in FIG. 2a, in one configuration of an embodiment of the extruder die assembly 20, the imprinting insert element 40 is positioned directly upstream of the forming insert element 50. Alternatively, as shown in FIG. 2b, in another configuration of the embodiment of the extruder die assembly 20a, two spacer insert elements 30 are inserted between the imprinting insert element 40 and the forming insert element 50. The thickness of each individual imprinting insert element 30 may be varied to allow incremental change of the axial distance between the imprinting insert element 40 and the forming insert element 50. The axial distance between the imprinting insert element 40 and the forming insert element 50 varies from 5 mm–55 mm, but in a preferred embodiment is 10 mm.

It will now be evident to those skilled in the art that there has been described herein an improved extruder die assembly and method for using the same to improve the quality of dimensional design aspects of extruded, complexly shaped, direct expanded food products.

Although the invention hereof has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. An extruder die assembly for improving the dimensional quality of complexly shaped, direct expanded food products, comprising in combination:

(a) an imprinting insert element having a first aperture defined therethrough and at least one prong extending into the first aperture;

(b) a forming insert element having a second aperture defined therethrough and positioned downstream from the imprinting insert element, wherein the shape of the second aperture is defined by at least one projection extending into the second aperture;

wherein each of the at least one projection aligns with a prong when said first and second apertures are coaxially aligned.

2. The extruder die assembly of claim 1 further comprising in combination a plurality of spacer insert elements having a third aperture defined therethrough, wherein said apertures are all coaxially aligned.

3. The extruder die assembly of claim 2 wherein the plurality of spacer insert elements are positioned upstream of the imprinting insert element.

4. The extruder die assembly of claim 2 wherein at least one of the plurality of spacer insert elements are positioned between the imprinting insert element and the forming insert element.

5. The extruder die assembly of claim 2 further comprising in combination a transition insert section having a passageway with an inlet and an outlet defined therethrough and positioned upstream of the said elements, wherein the passageway and said apertures are all coaxially aligned.

6. The extruder die assembly of claim 5 wherein the outlet has a circumference matching the third aperture.

7. The extruder die assembly of claim 1 wherein the forming insert element is positioned at least 5 mm downstream from the imprinting insert element.

8. The extruder die assembly of claim 1 wherein the forming insert element is positioned less than 55 mm downstream from the imprinting insert element.

9. The extruder die assembly of claim 1 wherein the forming insert element is positioned approximately 10 mm downstream from the imprinting insert element.

10. An apparatus for improving the dimensional quality of complexly shaped, direct expanded food products, comprising in combination:
   (a) means for supplying an extrudate flow wherein said means for supplying comprises means for receiving and directing the extrudate flow down a first passageway;
   (b) an imprinting insert die positioned downstream from the supplying means and having a first aperture defined therethrough which is coaxially aligned with the first passageway, and having at least one prong extending into the first aperture;
   (c) a forming insert die positioned downstream from the imprinting insert and having a second aperture defined therethrough which is coaxially aligned with the first passageway and the first aperture, and wherein the shape of the second aperture is defined by at least one projection extending into the second aperture;
   wherein each of the at least one projection aligns with a prong when said first and second apertures are coaxially aligned.

11. The apparatus of claim 10 further comprising in combination a plurality of spacer insert dies positioned downstream from the supplying means and having a third aperture defined therethrough which is coaxially aligned with the first passageway and the first and second apertures.

12. The apparatus of claim 11 wherein the plurality of spacer insert dies are positioned upstream of the imprinting insert die.

13. The apparatus of claim 11 wherein one or more of the plurality of spacer insert dies are positioned between the imprinting insert die and the forming insert die.

14. The apparatus of claim 11 further comprising in combination a transition insert section positioned downstream from the supplying means but upstream from said dies and having with an second passageway with an inlet and an outlet defined therethrough, wherein said second passageway is coaxially aligned with the first passageway.

15. The apparatus of claim 14 wherein the inlet of the second passageway matches the circumference of the first passageway and the outlet has a circumference matching the third aperture.

16. The apparatus of claim 10 wherein the forming insert die is positioned at least than 5 mm downstream from the imprinting insert die.

17. The apparatus of claim 10 wherein the forming insert die is positioned less than 55 mm downstream from the imprinting insert die.

18. The apparatus of claim 1 wherein the forming insert die is positioned approximately 10 mm downstream from the imprinting insert die.

19. An method for improving the dimensional quality of complexly shaped, direct expanded food products, comprising in combination:
   (a) supplying an extrudate flow comprising receiving and directing the extrudate flow down a first passageway;
   (b) directing the extrudate flow through an imprinting insert die positioned downstream from the first passageway, wherein said imprinting insert die has a first aperture defined therethrough which is coaxially aligned with the first passageway, and has at least one prong extending into the first aperture;
   (c) directing the extrudate flow through a forming insert die positioned downstream from the imprinting insert, wherein said forming insert die has a second aperture defined therethrough which is coaxially aligned with the first passageway and the first aperture, and the shape of the second aperture is defined by one or more projections extending into the second aperture;
   wherein each of the at least one projection aligns with a prong when said first and second apertures are coaxially aligned.

20. The method of claim 19 further comprising in combination, positioning a plurality of spacer insert dies upstream from the forming insert die, wherein said spacer insert dies each have a third aperture defined therethrough which is coaxially aligned with the first passageway and the first and second apertures.

21. The method of claim 20 wherein the plurality of spacer insert dies are positioned upstream of the imprinting insert die.

22. The method of claim 20 wherein one or more of the plurality of spacer insert dies are positioned between the imprinting insert die and the forming insert die.

23. The method of claim 19 wherein the forming insert die is positioned at least 5 mm downstream from the imprinting insert die.

24. The method of claim 19 wherein the forming insert die is positioned less than 55 mm downstream from the imprinting insert die.

25. The method of claim 19 wherein the forming insert die is positioned approximately 10 mm downstream from the imprinting insert die.

* * * * *

UNITED STATES PATENT AND TRADEMARK OFFICE
CERTIFICATE OF CORRECTION

| | |
|---|---|
| PATENT NO. | : 6,783,787 B2 |
| APPLICATION NO. | : 10/109398 |
| DATED | : August 31, 2004 |
| INVENTOR(S) | : Eugenio Bortone |

It is certified that error appears in the above-identified patent and that said Letters Patent is hereby corrected as shown below:

Col. 4, line 3, the following language was omitted and should be added at the end of the line -- distinguishable one another. --

The line should read as follows:

-- defined and distinguishable one another. --

Signed and Sealed this

Fifteenth Day of May, 2007

JON W. DUDAS
*Director of the United States Patent and Trademark Office*